United States Patent
Grove-Nielsen et al.

(10) Patent No.: US 9,610,736 B2
(45) Date of Patent: Apr. 4, 2017

(54) METHOD FOR MANUFACTURING A COMPOSITE USING A DEGRADABLE MEMBRANE

(71) Applicant: Siemens Aktiengesellschaft, Munich (DE)

(72) Inventors: Erik Grove-Nielsen, Roslev (DK); Jens Jorgen Ostergaard Kristensen, Nibe (DK); Peter Kybelund, Egtved (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 355 days.

(21) Appl. No.: 14/367,905

(22) PCT Filed: Dec. 13, 2012

(86) PCT No.: PCT/EP2012/075321
§ 371 (c)(1),
(2) Date: Jun. 21, 2014

(87) PCT Pub. No.: WO2013/092359
PCT Pub. Date: Jun. 27, 2013

(65) Prior Publication Data
US 2014/0361468 A1    Dec. 11, 2014

(30) Foreign Application Priority Data
Dec. 13, 2012    (EP) .................................. 11195628

(51) Int. Cl.
*B29C 70/44* (2006.01)
*B29C 70/54* (2006.01)
(Continued)

(52) U.S. Cl.
CPC ............ *B29C 70/44* (2013.01); *B29C 70/443* (2013.01); *B29C 70/54* (2013.01); *B29C 70/543* (2013.01);
(Continued)

(58) Field of Classification Search
None
See application file for complete search history.

(56) References Cited

U.S. PATENT DOCUMENTS

| | | |
|---|---|---|
| 2003/0025232 A1 | 2/2003 | Fish et al. |
| 2005/0255770 A1 | 11/2005 | Crump |

(Continued)

FOREIGN PATENT DOCUMENTS

| | | |
|---|---|---|
| CN | 101616787 A | 12/2009 |
| CN | 101909863 A | 12/2010 |

(Continued)

*Primary Examiner* — Monica Huson
(74) *Attorney, Agent, or Firm* — Beusse Wolter Sanks & Maire

(57) ABSTRACT

A method for manufacturing a composite is provided herein, including laying at least one reinforcement layer onto the inner surface of a mold, positioning a degradable membrane onto the outermost reinforcement layer of the at least one reinforcement layer, applying suction between the inner surface of the mold and the degradable membrane to press the at least one reinforcement layer towards the inner surface of the mold, covering the degradable membrane with at least one vacuum film, generating a vacuum in the region between the vacuum film and the mold, injecting resin into this region by means of vacuum, and letting cure the resin, initiating a degradation of the degradable membrane by provoking a physical or chemical change of the membrane material after having generated a vacuum in the region between the vacuum film and the mold and before the resin has cured completely.

16 Claims, 3 Drawing Sheets

(51) Int. Cl.
 B29L 31/08  (2006.01)
 B29K 25/00  (2006.01)
 B29K 33/04  (2006.01)
 B29K 67/00  (2006.01)

(52) U.S. Cl.
 CPC ...... *B29K 2025/06* (2013.01); *B29K 2033/04* (2013.01); *B29K 2067/06* (2013.01); *B29K 2995/0059* (2013.01); *B29L 2031/085* (2013.01); *Y02P 70/523* (2015.11)

(56) References Cited

U.S. PATENT DOCUMENTS

2010/0086765 A1   4/2010   Inston
2011/0049770 A1   3/2011   Stiesdal

FOREIGN PATENT DOCUMENTS

| EP | 1310351 B1 | 4/2006 |
| EP | 2123431 A1 | 11/2009 |
| JP | 558136412 A | 8/1983 |
| JP | 2003305733 A | 10/2003 |
| JP | 2010517829 A | 5/2010 |
| JP | 2011507739 A | 3/2011 |

METHOD FOR MANUFACTURING A COMPOSITE USING A DEGRADABLE MEMBRANE

CROSS REFERENCE TO RELATED APPLICATIONS

This application is the US National Stage of International Application No. PCT/EP2012/075321 filed Dec. 13, 2012, and claims the benefit thereof. The International Application claims the benefit of European Application No. EP11195628 filed Dec. 23, 2011. All of the applications are incorporated by reference herein in their entirety.

FIELD OF INVENTION

The present invention relates to a composite and to a method for manufacturing the composite.

BACKGROUND OF INVENTION

Modern fibre reinforced composites, e.g. wind turbine blades, are typically manufactured using Vacuum Assisted Resin Transfer Moulding, a process that produces strong, lightweight composites by infusing resin into compacted reinforcing materials under vacuum. A large part of the reinforcing material is usually glass or carbon fibre woven mats.

For deeply concave shapes of the inner face of the mould there may be a risk that the fibre mats are not maintained in a position firmly against the mould during lay-up.

Under certain circumstances, the fibre mats may tend to take on the shape of catenaries (like a hanging chain), leaving voids between the inner surface of the mould and the fibre mats ("hovering glass") instead of following the actual curvature of the mould. If several layers of fibre mats are placed on top of each other, friction between the layers may be strong enough to prevent the fibre mats from being pressed against the mould when vacuum is applied.

In the subsequent moulding process the voids between the surface of the mould and the fibre mats will be filled with resin that is not reinforced by any fibre material. As a result, the structural characteristics of the composite in the regions of "hovering glass" may not be as desired.

In addition, if on application of vacuum the glass is pressed partly or completely out into the void this may result in wrinkles and folds of the fibre mats, which may in turn lead to mechanical weaknesses if the wrinkles and folds are not flattened before the resin is injected.

In EP 1 310 351 B1, a manufacturing process of a wind turbine blade is disclosed, wherein a lower part of a mould is filled with layers of fibre glass and core material like balsa wood. Mould cores are covered by vacuum bags and placed in the mould together with a shear web. Then more fibre glass and core material is placed over the mould cores, and an upper part of the mould is put into place. Vacuum is introduced to the region between the vacuum bags and the mould, and resin is injected under vacuum.

EP 2 123 431 B1 describes another method of manufacturing a wind turbine blade, wherein an upper and a lower part of a mould are assembled. The method includes placing a vacuum distributing layer on the inner surface of both, the upper and the lower part of the mould. Each of the vacuum distributing layers is connected to a vacuum pump for applying suction. A layer of fibre glass mats is placed on the inner surface of the vacuum distributing layer and one or more layers of fibre glass mats are added, together with a layer of core material like balsa wood.

During the lay-up of the different layers, suction is applied between the inner surface of the mould parts and the layers by means of the vacuum distributing layer.

After having completed the lay-up in both parts of the mould, the mould cores with the vacuum bags and the shear web are placed in the lower part of the mould. Next, the upper part of the mould is turned 180 degree around its longitudinal axis and is put in place such that the mould is closed.

All the layers of fibre material in both parts of the mould, and particularly those that are in contact with the shear web, are suitable for lamination. Thus, the shear web becomes firmly integrated in the laminated blade structure.

Close to the edges of fibre glass lay-up the pressure between the individual layers is higher than elsewhere. Therefore suction may not be sufficient to prevent the layers from peeling away from the mould at the edges. To compensate for this, EP 2 123 431 B1 suggests to place a layer of a material which has a lower air permeability than the fibre mats in the mould on top of the outermost of these fibre mats. Placing such a layer, which may be referred to as a surface fibre material layer, on top of the outermost fibre mat increases the suction that holds the one or more fibre mats in place.

A number of conflicting requirements exist in relation to the above-mentioned surface fibre material layer.

On the one hand, it is desired that the surface fibre material layer has low permeability to air. In tendency, this leads to a type of fibre mat that is special, has relatively poor resin wetting properties and lower interlaminar shear strength than what is normally desirable.

On the other hand, it is desired that the surface fibre material layer, which forms part of the structural reinforcement of the laminate, is of a relatively conventional type, i.e. has good resin wetting properties and a high interlaminar shear strength relative to any joining structural elements, such as shells, beams, etc. In tendency, these requirements all lead to a fairly open, relatively permeable type of fibre material layer.

Furthermore, even with a relatively low air permeability of the outermost fibre layer, an extremely large air flow is necessary to maintain a sufficient pressure difference over the fibre lay-up, especially when moulding large composites like wind turbine blades.

SUMMARY OF INVENTION

Therefore, it is an object of the present invention to provide a method for manufacturing a composite, wherein the method overcomes the afore-mentioned disadvantages. A further object of the invention is to provide a composite with an enhanced quality compared to composites of such kind known in the art.

These objects are solved by the features of the independent claims. Further developments are subject of the depending claims.

The method for manufacturing a composite includes the steps of laying at least one reinforcement layer onto the inner surface of a mould, positioning a degradable membrane onto the outermost reinforcement layer of the at least one reinforcement layer, wherein the degradable membrane is made of a material having a lower air permeability than the at least one reinforcement layer, applying suction between the inner surface of the mould and the degradable membrane to press the at least one reinforcement layer towards the inner surface of the mould, covering the degradable membrane at least partly with at least one vacuum film, generating a vacuum in the region between the vacuum film and the mould, injecting resin into this region by means of vacuum, and letting the resin cure, wherein the method includes initiating a degradation of the degradable membrane by provoking a physical or chemical change of the membrane material after having generated a vacuum in the region between the vacuum film and the mould and before the resin has cured completely.

Thus, a surface layer is provided with sufficiently low air permeability to ensure vacuum consolidation during manufacturing before and during wetting of the reinforcement layers, e.g. fibre mats, core material or fibres, and which can form part of and be integrated with the final composite without significant negative influence on the composite properties, or which can be partly or completely removed, thus having no effect on the resulting composite. The composite may, of course, be a laminate.

Using such a membrane which degrades during the process allows a free choice of reinforcement material, e.g. fiber glass, to obtain an optimal interface between different parts of a composite structures even if they were separated by the membrane during a certain stage of the manufacture, e.g. during the first manufacturing steps.

In an embodiment of the invention, the degradation of the degradable membrane is initiated by a decomposing agent. The decomposing agent may be introduced as a gas into the vacuum. Alternatively, the decomposing agent may be introduced as part of the resin during the step of injecting the resin.

The resin, e.g. an unsaturated polyester, may comprise a solvent and the degradable membrane may be made of a material which is dissolvable into the solvent-comprising resin. An example of such a membrane material is a synthetic plastic material. In this case, the degradation of the degradable membrane is initiated during injecting of the resin and the constituent parts of the decomposed degradable membrane get mixed with the resin. Thus, the wetting of the reinforcement layers, e.g. fibre mats, is not negatively influenced by the degradation of the degradable membrane.

The resin may, for instance, comprise styrene and the degradable membrane may be made of a material comprising polystyrene. In this case, a fast degradation of the membrane by dissolution and the compatibility between resin and membrane material is ensured.

Alternatively, the resin may comprise an acrylate, a methacrylate or a diluent and the degradable membrane may comprise a material dissolvable in the respective resin. The use of a such a resin is more environment-friendly compared to the use of a resin comprising styrene, as the content and/or emissions of VOC (volatile organic compound) can be minimized or completely avoided.

In another embodiment of the invention, the degradation of the degradable membrane is initiated by water, which may be part of the resin, and the degradable membrane includes a material dissolvable or degradable in water. Such a membrane solution can be used with all resins that are not very water sensitive, and a membrane material made from sustainable material resources can be applied.

In a further embodiment of the invention, the degradation of the degradable membrane is initiated by exposure of the degradable membrane to a chemical substance other than a solvent.

In another embodiment of the invention, the degradation of the degradable membrane is initiated by heating the degradable membrane to a temperature above a predetermined temperature. The degradable membrane may, for instance, be heated to a temperature above the melting temperature of the membrane material which would cause the degradable membrane to degrade by melting.

In yet another embodiment of the invention, the degradation of the degradable membrane is initiated by provoking a sublimation of the degradable membrane. When using such a material, the degradable membrane can be partly or completely removed and thus, does not affect the properties of the final composite. Such a material could also be used for any type of resin.

In a further embodiment of the invention, the degradation of the degradable membrane is initiated by a change of the vacuum in the region between the vacuum film and the mould. Thus, the membrane can irreversible be made open for diffusion simply by controlling the pressure. Such a material could also be used for any type of resin.

In yet a further embodiment of the invention, the degradation of the degradable membrane is initiated by exposure of the degradable membrane to light.

In another embodiment of the invention, the degradation of the degradable membrane is initiated by a molecular degradation. When this method is applied, the material is degraded into small molecular units (e.g. monomers) which can, by the right choice of material, be directly incorporated into the composite.

In a further embodiment of the invention, the degradable membrane is either impermeable or partially permeable to air, e.g. perforated, at the time the degradable membrane is positioned onto the outermost reinforcement layer of the at least one reinforcement layer. A partially permeable membrane allows for a controllable air permeability of the degradable membrane. A controlled air permeability may, for instance, be important to consolidate subsequently applied layers of e.g. fibre reinforcements, core materials or other materials.

In another embodiment of the invention, the degradable membrane is rigid in terms of its structure. Alternatively, the membrane may be stretchable. In a further embodiment, the membrane may be attached to a carrier medium. The rigidity, the stretchability as well as the attachment to a carrier medium are advantagous for withstanding the forces applied to the degradable membrane during use, e.g. layup and applying of vacuum.

The composite, manufactured using the above mentioned method, includes at least one reinforcement layer, wherein the at least one reinforcement layer includes an outermost reinforcement layer, which was at least partly covered by a degradable membrane during manufacturing of the composite, wherein the constituent parts of the degraded degradable membrane were either fusioned with the outermost reinforcement layer or were removed.

In case the degradable membrane becomes fused to the outermost reinforcement layer, the composite includes the constituent parts of the degraded degradable membrane.

In another embodiment of the invention, the composite is comprised in a wind turbine blade. This wind turbine blade is of enhanced quality compared to wind turbine blades known in the art, because the quality of the composite itself is enhanced and any structural parts connected to the composite inside of the wind turbine blade are firmly connected to the composite due to the fact that the membrane is fused to the reinforcement layer stack or removed during manufacturing. The connected parts may be assembled separately and then be handled under a vacuum and joined together into one composite or laminate, during one infusion process, thus avoiding a subsequent bonding process.

In the following, the invention will be described by way of example in more detail.

BRIEF DESCRIPTION OF THE DRAWINGS

The drawings show preferred configurations and do not limit the scope of the invention. The same reference numerals are used in the drawings for elements having the same function.

DETAILED DESCRIPTION OF INVENTION

Figure 1:
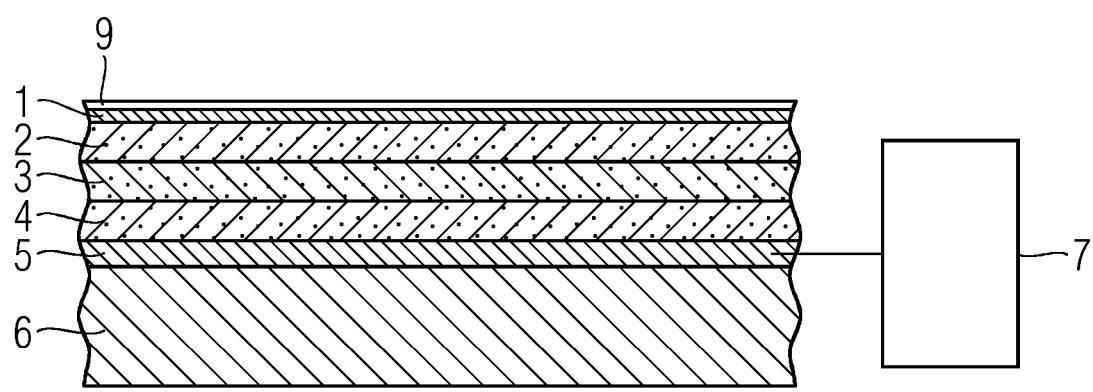
FIG. 1 shows schematically a sectional view of a part of a stack of reinforcement layers, a degradable membrane and the mould during manufacturing

As shown by the part of the layer stack in FIG. 1, the method for manufacturing a composite includes laying at least one reinforcement layer 2, 3, 4 onto the inner surface of a mould 6.

Further, a degradable membrane 1 is positioned onto the outermost reinforcement layer 2 of the at least one reinforcement layer 2, 3, 4. The degradable membrane 1 is made of a material having a lower air permeability than the at least one reinforcement layer 2, 3, 4.

The degradable membrane 1 is placed on top of the complete stack of fibre reinforcement layers 2, 3, 4 so as to form a barrier to air passage for the vacuum consolidation of the complete stack of fibre reinforcement layers 2, 3, 4 which may also include, core materials, etc.

Then, suction is applied between the inner surface of the mould 6 and the degradable membrane 1 to press the at least one reinforcement layer 2, 3, 4 towards the inner surface of the mould 6. Suction may be applied by a vacuum pump 7 and may be distributed with or without a suction distributing layer 5.

In case a suction distributing layer 5 is used, this layer is positioned between the inner surface of the mould 6 and the at least one reinforcement layer 2, 3, 4 and it becomes an integrated part of the final composite.

The suction distributing layer 5 is for instance not necessary, if a vacuum tight degradable membrane is used during manufacturing. In case a degradable membrane with lower permeability than the glass fiber fabric is used, the suction distributing layer 5 may be of another type of reinforcement layer 2, 3, 4, e.g. glass fiber fabric, with a higher air permeability than the other reinforcement layers 2, 3, 4.

Then, the degradable membrane 1 is covered at least partly with at least one vacuum film 9. This means that one or more the vacuum films 9 are positioned on top of the degradable membrane 1.

After having placed the vacuum film 9, a vacuum is generated in the region between the vacuum film 9 and the mould 6.

Following this, resin is injected into the region between the vacuum film 9 and the mould 6. The resin is injected under vacuum. Preferably, the resin is drawn into the region between the vacuum film 9 and the mould 6 by means of vacuum.

Finally, the resin is cured and then, the mould 6 is removed.

The method includes initiating a degradation of the degradable membrane 1 after having generated a vacuum in the region between the vacuum film 9 and the mould 6 and before the resin has cured completely.

The degradation of the degradable membrane 1 is initiated by provoking a physical or chemical change of the membrane material 1.

That means, the degradable membrane 1 is made of a material that can change its physical or chemical form so as to become open for diffusion at a controlled stage in the composite part production process, e.g. during the wetting of the fibres or during the curing of the laminate without impairing the quality of the final product.

The initial properties of the degradable membrane 1 are changed no matter which process is used to change the physical or chemical form of the material.

The degradable membrane 1 may be completely impermeable to air before initiating the degradation of the membrane 1. Alternatively, the degradable membrane 1 may be partially permeable, e.g. perforated, before degrading.

That means, at the time the degradable membrane 1 is positioned onto the outermost reinforcement layer 2 of the at least one reinforcement layer 2, 3, 4, it may be either completely closed or partially opened so as to allow for a controlled air permeability.

Further, the term "membrane" refers to a thin film or separation layer and "degradable membrane" may also be referred to as "decomposable membrane".

The degradable membrane 1 forms temporarily a surface film, wherein the thickness of the degradable membrane 1 is, preferably, below 0.1 mm. This ensures a fast degradation of the membrane and minimizes the amount of membrane material in the final composite part.

In addition, the membrane material should be at least partly compatible with the resin, to ensure a strong interface bond between the remaining membrane material, if any after degradation, and the resin used in the manufacturing method in order not to affect the final composite properties negatively.

In its original form, the degradable membrane 1 has sufficient mechanical properties to withstand the forces applied during use, e.g. layup and processing with vacuum. It is, for instance, fairly rigid in terms of its structure or stretchable.

In relation to the resin used for the manufacturing method according to the invention, different groups of resin materials may be used, a solvent containing resin and a non-solvent containing resin. For each of these resins, different approaches can be used.

For the solvent containing resins, a degradable membrane 1 made of a material which is soluble in the solvent of the resin may be applied. The degradation of the degradable membrane 1 is initiated by the solvent as decomposing agent.

The degradable membrane 1 can be applied either as is or can be attached to a carrier medium, e.g. a fiberglass fabric, by a suitable adhesive, thermo bonding or stitching. Using the latter approach can protect the membrane during handling.

The degradable membrane 1 may also be produced directly on top of the outermost reinforcement layer 2 or directly on top of the carrier medium, e.g. by coating the surface of the outermost reinforcement layer 2 or the carrier medium. Thereby, the surface of the said layer 2 or carrier medium is closed to form the degradable membrane 1.

In case of using a solvent-comprising resin, the degradable membrane 1 stays intact until resin is injected into the appropriate region and comes into contact with the degradable membrane 1. The degradable membrane 1 is then dissolved and mixed with the resin and the materials previously separated by the membrane, e.g. different parts of the fibreglass structure, can merge and form the final laminate.

In an embodiment of the invention, the resin includes styrene and the membrane is made of a material consisting of a polystyrene polymer.

In another embodiment of the invention, the resin includes styrene and the degradable membrane 1 is made of a material comprising polystyrene, for example Acrylonitrile-Butadiene-Styrene polymer (ABS), Styrene-Acrylonitrile polymer (SAN) or Styrene-Butadiene rubber (SBR).

As an alternative to the above-mentioned membrane 1 dissolvable in resins containing styrene, the degradable membrane 1 may comprise a material dissolvable in a resin containing other solvents, e.g. acrylates, methacrylates or diluents, used e.g. in epoxy resins, or even dissolvable in water. In this sense, a solvent is any material which has the ability to dissolve a solid or semi-solid material. The use of those "non-styrene resins" may have the advantage of a reduced impact on the working conditions and the environment.

Furthermore, for resins not containing solvents, e.g. epoxy or polyurethane or biopolymer, other approaches are applicable. These approaches could, however, also be used for solvent containing resins.

In order to make a degradable membrane 1 degrade using a non-solvent containing resin, the degradation must be triggered by another controlled event. This may be, for example, a change in temperature, a change in vacuum, an exposure to chemicals other than a solvent, an exposure to light or a combination of one or more of these factors.

In an embodiment of the invention, the degradable membrane 1 is made of a synthetic plastic material which sublimates in high vacuum, e.g. in the range of 0-50 mbar absolute pressure, at room temperature or at a higher temperature which is below 100° Celsius. Thereby, "sublimate" refers to a phase transition of the membrane material into gas.

In another embodiment of the invention, the degradable membrane 1 is made of a synthetic material that sublimates at temperatures between 50° C. and 300° C., preferably at a temperature below 100° C.

Moreover, the degradable membrane 1 could be made of a synthetic material that melts at elevated temperatures, for instance at temperatures between 50° C. and 100° C., and thereafter is dissolved and/or absorbed into the matrix plastic material which forms part of the final composite.

As mentioned before, the degradation of the degradable membrane 1 may be initiated by a change in vacuum, that means a change of the vacuum condition in the region between between the vacuum film and the mould. Such a change could, for instance, be a change of the direction of the pressure gradient over the degradable membrane 1, e.g. if on the upper side of the membrane the pressure is initially higher than on the lower side of the membrane, this is changed so that the pressure on the lower side becomes higher than that on the upper side. Here, the lower side is the side of the degradable membrane 1 facing the mould 6 or being directed towards the mould 6 and the upper side of the degradable membrane 1 is the side opposite to the lower side.

Besides, as mentioned above, the degradation of the degradable membrane 1 may be initiated by exposure of the degradable membrane 1 to light, e.g. ultraviolet light, also referred to as ultraviolet radiation or infrared light. Moreover, the degradation of the degradable membrane 1 may be initiated by a molecular degradation.

Figure 2:
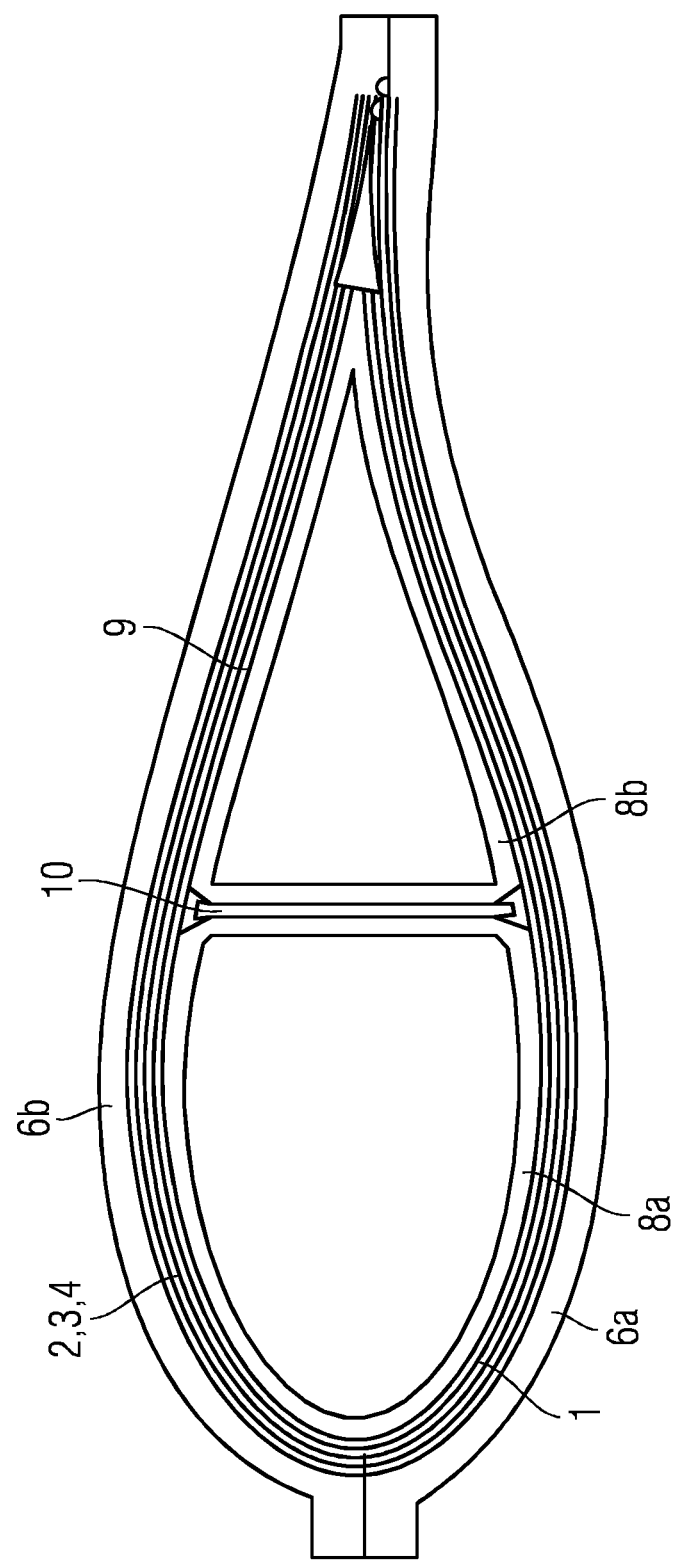
FIG. 2 shows schematically a sectional view of reinforcement layers and a degradable membrane positioned in a mould for manufacturing a wind turbine blade

As shown in FIG. 2, the method for manufacturing a composite may be used to manufacture a wind turbine blade. For the manufacturing of a wind turbine blade, the mould 6 may comprise a lower mould part 6a and an upper mould part 6b. The vacuum film 9 may be a vacuum bag 9 which encloses a mould core 8a, 8b.

As further shown in FIG. 2, a structural reinforcing part 10, e.g. in form of a shear web 10, may be placed on top of the degradable membrane 1 which in turn is placed on top of the at least one reinforcement layer 2, 3, 4. After the degradation of the degradable membrane 1 during the manufacturing process, this structural reinforcing part 10 is firmly connected to the composite of the wind turbine blade.

Figure 3:
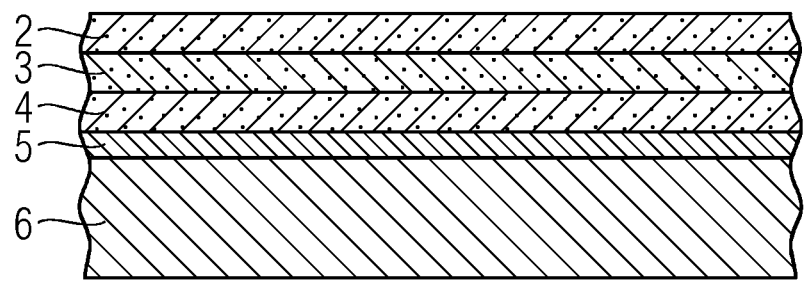
FIG. 3 shows schematically a sectional view of a part of the final composite before removing the mould.

FIG. 3 shows schematically a part of the composite which includes at least one reinforcement layer 2, 3, 4, wherein the at least one reinforcement layer 2, 3, 4 includes an outermost reinforcement layer 2 which was covered by a degradable membrane during manufacturing of the composite, wherein the constituent parts of the degraded degradable membrane 1 were either fused with the outermost reinforcement layer 2 or were removed.

In case of fusioning of the degraded degradable membrane 1 with the outermost reinforcement layer 2 during manufacturing of the composite, the final composite includes constituent parts of the degraded degradable membrane 1.

As shown in FIG. 3, at least one suction distributing layer 5 may, optionally, be comprised in the composite for distributing suction between the inner surface of the mould 6 and the degradable membrane 1 during manufacturing of the composite. If present, the suction distributing layer 5 is an integrated part of the final composite.

The before-mentioned composite may be comprised in a wind turbine blade. In this case, the outermost reinforcement layer 2, which may become fused with the degraded degradable membrane 1 or freed from the degraded degradable membrane 1, is positioned at the inside of the wind turbine blade. Thus, structural reinforcing parts 10, like a shear web, may be firmly connected to the composite to form a wind turbine blade with enhanced structural properties.

The addition of the degradable membrane 1 during manufacturing of the final composite may lead to a better quality of the final composite compared to what is possible by only using the usual reinforcement layers, such as fibreglass, carbon fibre or similar, which in general form part of the structure, because proper placement of the reinforcement materials is ensured throughout the manufacturing process.

Moreover, the addition of the degradable membrane 1 can facilitate an independent layup and movement of separate composite parts and the joining of these composite parts before and during the resin injection to form a single composite part without the need for a subsequent bonding process, which also introduces weaknesses in the composite structure.

The invention claimed is:
1. A method for manufacturing a composite comprising:
  laying at least one reinforcement layer onto the inner surface of a mould,
  positioning a degradable membrane onto an outermost reinforcement layer of the at least one reinforcement layer, wherein the degradable membrane is made of a material having a lower air permeability than the at least one reinforcement layer, applying suction between the inner surface of the mould and the degradable membrane to press the at least one reinforcement layer towards the inner surface of the mould, covering the degradable membrane at least partly with at least one vacuum film, generating a vacuum in the region between the vacuum film and the mould, injecting resin into the region between the vacuum film and the mould by means of vacuum, and letting the resin cure and initiating a degradation of the degradable membrane by provoking a physical or a chemical change of the degradable membrane material after having generated a vacuum in the region between the vacuum film and the mould and before the resin has cured completely.

2. The method according to claim 1, wherein the degradation of the degradable membrane is initiated by a decomposing agent introduced as a gas into the vacuum or as part of the resin.

3. The method according to claim 1, wherein the resin comprises a solvent and the degradable membrane comprises a material which is dissolvable into the solvent-comprising resin.

4. The method according to claim 1, wherein the resin comprises styrene and the degradable membrane comprises a material comprising polystyrene.

5. The method according to claim 1, wherein the resin comprises an acrylate, a methacrylate or a diluent and the degradable membrane comprises a material dissolvable in the respective resin.

6. The method according to claim 1, wherein the degradation of the degradable membrane is initiated by applying water to the degradable membrane and wherein the degradable membrane comprises a material dissolvable or degradable in water.

7. The method according to claim 1, wherein the degradation of the degradable membrane is initiated by exposure of the degradable membrane to a chemical substance other than a solvent.

8. The method according to claim 1, wherein the degradation of the degradable membrane is initiated by heating the degradable membrane to a temperature above a predetermined temperature.

9. The method according to claim 1, wherein the degradation of the degradable membrane is initiated by provoking a sublimation of the degradable membrane.

10. The method according to claim 1, wherein the degradation of the degradable membrane is initiated by a change of the vacuum conditions in the region between between the vacuum film and the mould.

11. The method according to claim 1, wherein the degradation of the degradable membrane is initiated by exposure of the degradable membrane to light or by a molecular degradation.

12. The method according to claim 1, wherein the degradable membrane is either completely impermeable or partially permeable at the time the degradable membrane is positioned onto the outermost reinforcement layer of the at least one reinforcement layer.

13. The method according to claim 1, wherein the degradable membrane is rigid, stretchable, attached to a carrier medium and/or produced directly on top of the outermost reinforcement layer or on top of a carrier medium.

14. The method of claim 3, wherein the resin comprises an unsaturated polyester material.

15. The method of claim 3, wherein the degradable membrane material comprises a synthetic plastic material.

16. The method of claim 12, wherein the partially permeable degradable membrane is perforated.

* * * * *